US006804338B1

United States Patent
Chen (10) Patent No.: US 6,804,338 B1
(45) Date of Patent: Oct. 12, 2004

(54) ELECTRONIC TELEPHONE DIRECTORY

(75) Inventor: Lim Boon Chen, Hong Kong (HK)

(73) Assignee: Cybiotronics, Inc. (HK)

( * ) Notice: Subject to any disclaimer, the term of this patent is extended or adjusted under 35 U.S.C. 154(b) by 0 days.

(21) Appl. No.: 09/564,912

(22) Filed: May 4, 2000

(51) Int. Cl.$^7$ ................................................ H04M 1/56
(52) U.S. Cl. ............................ 379/142.08; 379/142.04; 379/142.06
(58) Field of Search .......................... 379/142, 355.01, 379/355.02, 355.06, 355.07, 215.01, 142.01, 142.04, 142.06, 142.08; 455/414.1, 415

(56) References Cited

U.S. PATENT DOCUMENTS

| | | | | |
|---|---|---|---|---|
| 4,945,557 A | * | 7/1990 | Kaneuchi et al. | |
| 5,187,735 A | * | 2/1993 | Herrero Garcia et al. | |
| 5,289,530 A | * | 2/1994 | Reese | 379/88.01 |
| 5,481,594 A | * | 1/1996 | Shen et al. | 379/88.19 |
| 5,568,546 A | * | 10/1996 | Marutiak | 379/355.5 |
| 5,590,189 A | * | 12/1996 | Turnbull et al. | 379/355.05 |
| 5,881,134 A | * | 3/1999 | Foster et al. | 379/88.01 |
| 6,005,927 A | * | 12/1999 | Rahrer et al. | 379/142.01 |
| 6,067,349 A | * | 5/2000 | Suder et al. | 379/88.19 |
| 6,249,579 B1 | * | 6/2001 | Bushnell | 379/356.01 |
| 6,269,159 B1 | * | 7/2001 | Cannon et al. | |
| 6,339,710 B1 | * | 1/2002 | Suzuki | |

* cited by examiner

*Primary Examiner*—Curtis Kuntz
*Assistant Examiner*—Barry W Taylor
(74) *Attorney, Agent, or Firm*—Townsend and Townsend and Crew LLP (57) ABSTRACT

A method and apparatus for automatic creation of an electronic telephone directory uses intelligent automatic recognition of whether a telephone number is considered by the user as an important one or not. A telephone number is recognized to be an important one when certain user actions or situations relating to this telephone number occur. These include calling back a Caller ID number repeatedly or a certain number of times within a certain time period, receiving the same Caller ID number repeatedly within a certain time period, manually dialing a number that matches one of those in the memories; or, during a Caller ID on Call Waiting, exercising options like dropping the existing call and switching to the new caller, etc. Once a telephone number is determined to be an important one based on these criteria, the number is automatically stored into a permanent memory that is the electronic directory.

14 Claims, 7 Drawing Sheets

Auto store a manual dialed number/name to Directory

ELECTRONIC TELEPHONE DIRECTORY

PRIOR ART AND BACKGROUND OF THE INVENTION

The present invention relates to the automatic creation of an electronic phone directory via Caller Identification ("Caller ID") data and via manual dialing of telephone calls. It also relates to remote access of Caller ID and directory data, either via a dedicated hand-held unit, or via audible means over an ordinary telephone.

Caller ID service has become popular in recent years. Most Caller ID units have a Caller ID memory, and the data of the incoming calls is stored into the memory in a "first-in-first-out" sequence, i.e. when the memory is full, the data of the oldest caller is erased to make room to store the data of a new incoming call. Some units also have a second memory for permanent storage of data transferred from the Caller ID memory. However, the transfer is usually manually actuated. Furthermore, to access the Caller ID memory, the present Caller ID products use a "scroll up" and a "scroll down" key. This method of access is not convenient when the capacity of the memory is large and full of numbers.

The number of a caller sent by the phone company usually includes an area code of the area where the call originates, even if it is a local call. Thus, for local call-back dialing, the area code may have to be excluded. To exclude the dialing of the area code, many Caller ID units require the storage of area code numbers of the user's location into the memory. When the caller makes a call, the unit will compare the area code of the dialed number with the stored area codes. If they are the same, the area code will not be dialed. As quite a few area codes have to be pre-stored, particularly with the advent of "overlay" area codes, the manual storage of area codes is also tedious.

Moreover, "talking Caller ID" or "voice Caller ID" devices exist which plays an audible announcement of the Caller ID information when a call is received, or when reviewing a Caller ID from a list. The number and/or name of the Caller ID is played using voice, so that the user can know the identity of the caller just by listening to the announcement, without having to look at the display screen of the caller ID device. However, such techniques are useful only when the user is at his/her home or office. The voice announcement of Caller ID can only be heard if the user is at the same room/location as the Caller ID device. If the user is on-the-road or otherwise in a remote location, the Caller ID information becomes inaccessible. Similarly, there is no easy way for a user to remotely access the directory stored at a telephone located at a user's home or office.

SUMMARY OF THE INVENTION

The present invention provides an improved electronic telephone directory that provides a telephone user greater convenience than is available with prior art units.

The first aspect of the present invention is directed to a method and apparatus for automatic selection of those important/frequently used phone numbers and for automatic transfer of them to a permanent memory. A phone number related to certain operation is defined as an important/frequently used number under one or more of the following criteria:

(1) a number from Caller ID memory has been called back for one or more than "n" times within a certain length of time;

(2) a Caller ID number has been received repeatedly after and before a certain length of time (e.g. after 5 hrs and before 48 hrs.) for 2 or more than "n" times;

(3) a number is repeatedly dialed out after and before a certain length of time (e.g. after 5 hrs and before 24 hrs.) for 2 or more than "n" times;

(4) the last 7 digits of a manually dial out number is found to be matched with the last 7 digits of a number in Caller ID memory; and (5) For Caller ID on call waiting, that is, a Caller ID of a third party which is received while the user is already engaged in a telephone call, the user has at least 2 options to handle this new call. One option is to ignore this new call, and the other option is to accept the new call and switch to talk to the third party. If the present invention detects and records that a user has manually accepted such a call-waiting, the number found in the Caller ID on call waiting of this call is auto determined to be an important telephone number.

Another aspect of the invention is directed to automatic deletion of numbers. When the memory is full, those numbers which have not been dialed for 6 or "n" months or those with least dialing times are automatically deleted except those numbers which with VIP flag are kept for permanent storage.

Yet another aspect of this invention is to provide a method and apparatus for automatic storage of a list of area codes. All received Caller ID numbers will be compared with a list of manual dial out and actual call back numbers. The area codes will be extracted and then add to the memory list of area codes.

A further aspect of the present invention is to provide a method and apparatus for remote access of Caller ID and directory data. In a first embodiment, a portable hand-held unit is provided to allow the user to access Caller ID and directory information when the user is on-the-road.

In accordance with other factors, the invention enables remote access of Caller ID's and possible directory information by a portable hand-held unit, or by playing a voice announcement of Caller ID and directory data to an ordinary telephone via telephone line.

BRIEF DESCRIPTION OF THE DRAWINGS

The preferred embodiment of this invention will be described in detail in conjunction with the following drawings, in which.

DETAILED DESCRIPTION OF THE PREFERRED EMBODIMENT

Figure 1:
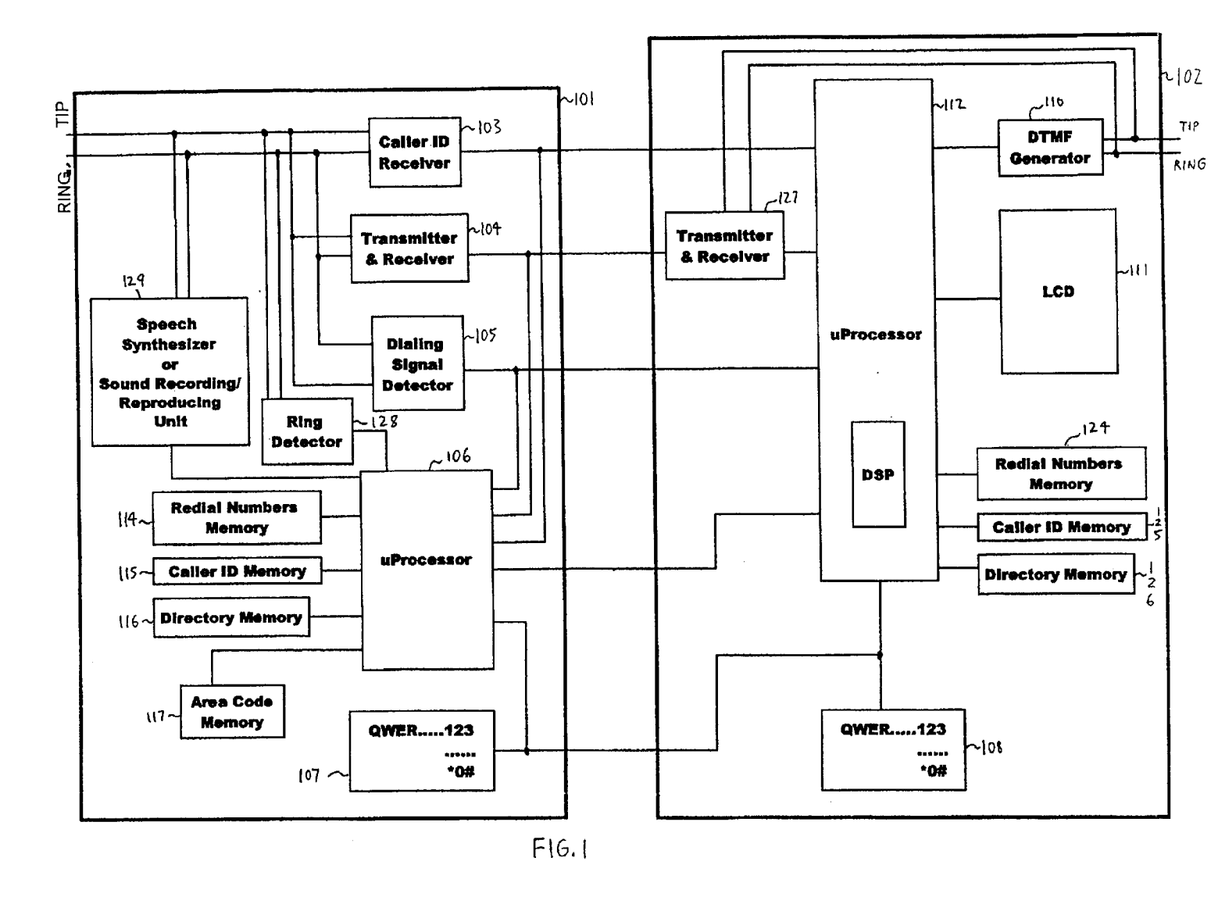
FIG. 1 is a functional block diagram of the electronic telephone directory according to the present invention and utilizing a base unit and a hand held unit.

FIG. 1 of the drawings shows a functional block diagram of an electronic telephone directory of the present invention, which includes a base unit 101 and a hand held unit 102. The base unit includes a Caller ID Receiver 103, a dialing signal detector 105, a microprocessor 106, and a keypad 107. It also contains a ring detector 128 for detecting the presence of ringing on the telephone line. A speech synthesizer or sound recording/reproducing unit 129, which can be controlled by the microprocessor, is connected to the telephone line for playing voice announcement over the telephone line. The hand-held unit includes a microprocessor 112 having a DSP (digital signal processing) capability, a DTMF generator 110, a LCD display 111 and a keypad 108. The hand-held unit is portable for on-the-road use.

Both the base unit 101 and the held-held unit 102 contains a Transmitter & Receiver, namely 104 and 127. They can be used for transmitting information between the two units. Dialing is also accomplished with the Transmitter/Receiver units 104, 127.

The Caller ID receiver 103 receives and converts the Caller ID signals and sends it to microprocessor 112 or 106 for processing. The method and circuitry for processing of receiving, storing, retrieving and calling/dialing back of Caller ID data are conventional known and commercially available.

These units 101 and 102 can be combined into a single unit in case a hand held/carry unit is not required. In that case, the microprocessor 106 and keyboard 107 can be omitted, and detector of block 105 may also be omitted and held unit 102 could be a plug-in/out unit into the base. This architecture enables the method of this invention to be flexibly used with any apparatus which contains an electronic phone directory.

There are several memories that are used in the base unit: a Redial Numbers Memory 114, a Caller ID Memory 115, and a permanent Directory Memory 116. The Redial Numbers Memory 114 stores a list of numbers that have been recently dialed by the unit. The Caller ID Memory 115 stores the Caller ID data received from the telephone line. The Directory Memory 116 stores telephone numbers and names which are automatically created in a novel way as disclosed in the present invention. The Redial Memory 114 and Caller ID Memory 115 can typically implemented using conventional volatile memory technology such as static RAM, while the Directory Memory 116 is usually implemented using permanent memory technology such as EEPROM or flash memory. The hand-held unit contains "mirror" Redial Memory 124, Caller ID Memory 125 and Directory Memory 126. The data in each of these "mirror" memories are mirror copy of the corresponding memory areas in base unit 101.

Figure 2:
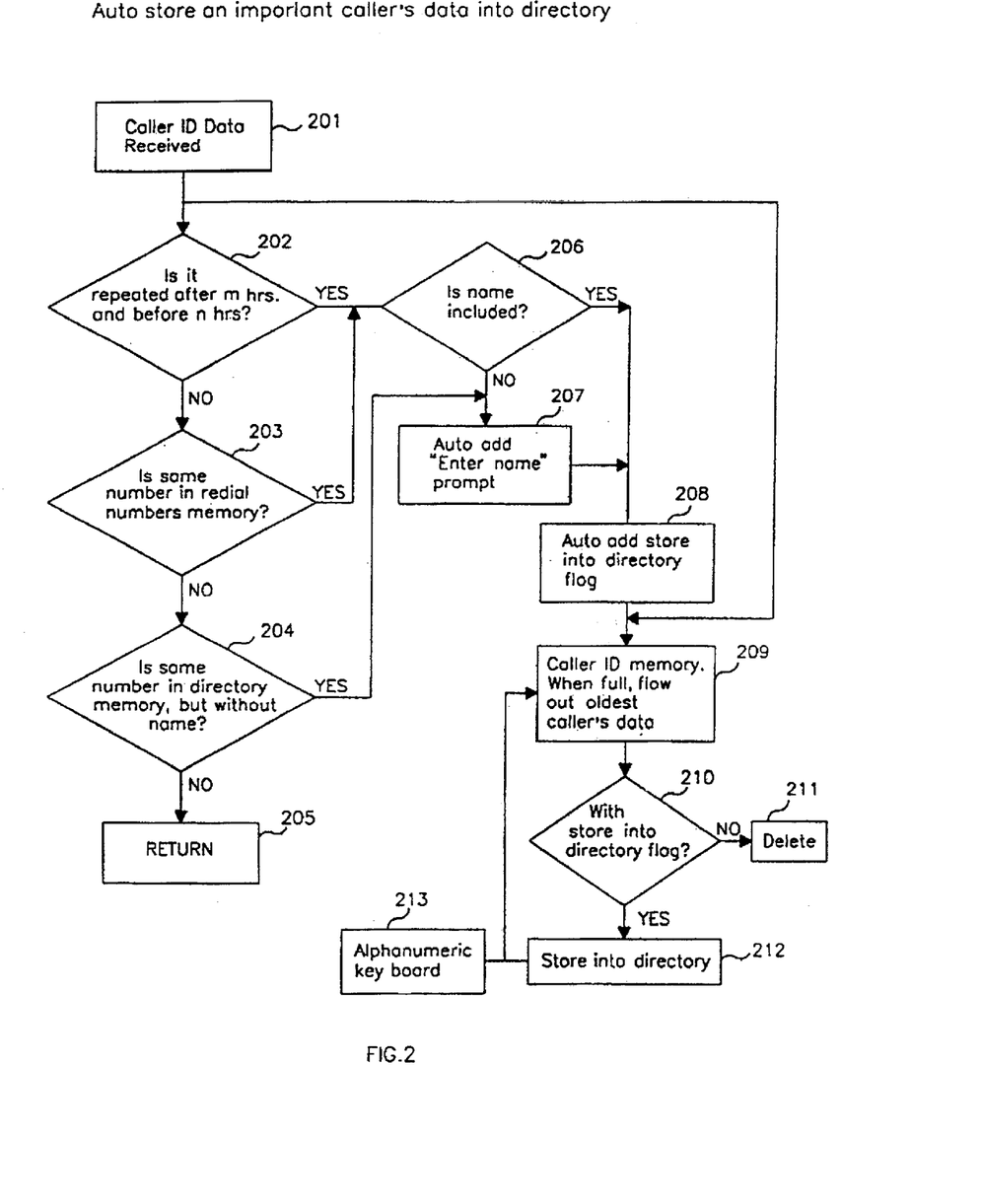
FIG. 2 is a flow diagram of the routines of processing of "important Caller ID" data and the storage of that data into the directory memory.

FIG. 2 shows a detailed flow diagram of the routines of processing an "important" Caller ID data and storage of the data into the permanent memory directory. When a Caller ID data is received, as shown in step 201 of FIG. 2, microprocessor 112 or 106 of FIG. 1, will examine, at step 202, if there is the same number in Caller ID Memory 115; and, if the same number was received after m hours and before n hours, and will further examine at step 203, if the same number is in Redial Memory 114. If either test results in a YES, the data will be further examined at step 206, to see if a name is included. If it is included, the data will be processed at step 208 for adding a flag of "store into directory" to the data and then sent to store into the Caller ID Memory as shown at step 209. When the Caller ID Memory is full, the oldest caller's data will be removed from the Caller ID Memory. It is then further examined at step 210 to see if a "store into directory" flag is included; and, if YES, then the data will be stored back into the Directory Memory 116. If the flag is not present, the data will be deleted and discarded as shown at step 211.

If at step 206, if the answer is NO, as shown at step 207 a prompt of "Enter name" which for/showing in LCD with the number will be add to the data/number and then further processed at step 208 as previously mentioned.

If at step 203, if the answer is NO, the microprocessor will further examine, at step 204, whether the same number is in the directory but without a name. If the answer is YES, the number will also further processed as shown at step 207, as mentioned previously.

As shown in block 213 of FIG. 2, the alphanumeric key board of 107 or 108 of FIG. 1 not only can be used to access the Directory Memory 116, but also can be used to access the Caller ID Memory 115. This arrangement not only helps to quickly and easily search for a desired phone number, but also enhances the efficiency of using of memory capacity.

It should be noted that Caller ID can be classified into two types. Caller ID which is received when the phone is not in-use (on-hook), and which is usually accompanied by ringing, is called type I Caller ID. Caller ID which is received when the phone is already in-use (off-hook); that is, when the user is already engaged in a telephone conversation with a second party, is called type II Caller ID, or Caller ID on Call Waiting. The type II Caller ID provides another opportunity for determining if a telephone number is important or not.

When Caller ID on Call Waiting is received, a telephone user has at least two options on how to treat the new call. The first option is to ignore the new call, and continue the existing telephone conversation. Obviously, in this case the user thinks that this new call is unimportant. The second option is to accept the new call, to switch to talk to the new call-waiting caller, and put the call of the second party on hold. The fact that the user decides to interrupt an existing call to switch to the new third party caller, after seeing the Caller ID of the new caller, is a strong suggestion that the caller considers this telephone number an important one. Hence, the present invention can be made to automatically mark the Caller ID of these manually accepted call-waiting call as important, and store the number into the Directory Memory 116. To do this, the Dialing Signal Detectors 105 must monitor any "flash" signal which is used for switching to another caller during call waiting. If the "flash" signal, which is usually generated when a user manually presses a "flash" key to accept a call-waiting, is detected, then the Caller ID received by Caller ID Receiver 103 during the call waiting is determined by the microprocessor 112 as an important number, and can be stored into the Directory Memory 116. The routine for automatically storing such important Caller ID on call waiting into the Directory Memory is very similar to that described in the flow chart of FIG. 2. In fact, it is entirely possible to use the same routine to store this important Caller ID on Call Waiting, by requiring this kind of call only has to be received one time within a certain time period for it to be considered important. The important Caller ID on Caller Waiting data is thus automatically stored into the permanent directory memory.

Furthermore, more advanced Caller ID technology, sometimes known as type 2.5 gives the user even more options and flexibility in handling a call-waiting call. Besides the two options described, additional options are made available to the users. One of them is "Take Message". Under this option, the new call-waiting caller is redirected to a voice mail system, so that the call-waiting caller can leave an voice recording. It is also possible to redirect the call to any other telephone number, for example to a human telephone receptionist. Another option is to "Play Announcement". If this option is selected, a voice message will be played to inform the call-waiting caller that the user is unavailable to take the call, and then the new caller will be disconnected. Yet another option is called "Drop Current Call." A user may select this option to disconnect the call with the existing second party, and switch to talk to the new caller instead. The fourth option is "Conference." This option allows the new call-waiting call and the existing call to be joined into a telephone conference, so that all the three parties can talk to each other at the same time.

If the user's telephone line is equipped with this more advanced type 2.5 Caller ID technology, the option manually selected by user during call-waiting can also be recorded by the present invention, and the Caller ID number can be determined to be important or not, and be transferred to the directory memory accordingly. Obviously, if the user selects the "Take Message" or "Play Announcement" option to handle a call-waiting call, this indicates that the user thinks the telephone call is mostly unimportant. On the other hand, if the user selects the "Drop Current Call" option to switch to talk to the new caller, or selects the "Conference" option to join the new caller into a telephone conference, certainly the user regards the call-waiting caller as highly important and worthy of his/her immediate attention. The present invention can thus be made to determine that call-waiting call handled by the user in these ways as important, and store them into the directory. To ensure call-waiting calls handled by these additional options are determined as important, it can be easily implemented in the same way as that for the two basic call-waiting options as described above. The Dialing Signal Detectors 105 can be made to monitor the signals generated when the user selects the "Drop Current Call" or "Conference" options. Usually, the signal generated when the user press keys to select one of these actions are "flash" plus DTMF '7', and "flash" plus DTMF '3', for the "Drop Current Call" and "Conference" options respectively. If these dialing signal are detected during call-waiting, the Caller ID number received for the call-waiting is determined to be important, and is thus stored into the telephone directory.

In a similar manner, it is also possible to determine if a type I (on-hook) Caller ID number is important or not, by having the present invention to monitor and record if the user picks up the handset to answer the call or not. Circuit to detect if a telephone line is in-use is well known in the arts. If, after a on-hook Caller ID is received, it is found that the telephone line becomes in-use, it is obvious that the user has answered that call, so the Caller ID number is probably considered by the user to be an important one. Hence, the present invention can be made to automatically store these Caller ID numbers of answered calls into the telephone directory. Similarly, if it is found that the telephone line does not become in-use within a short time period after a on-hook Caller is received, this indicates that the user decided not to answer the call, and the Caller ID number must have been an unimportant one. Furthermore, using the method similar to that in the flowchart of FIG. 2, it is not necessary to treat the Caller ID number of all answered call as important. It can be made in such a way that, only if a call of same Caller ID number is received and answered by the user repeatedly after and before a certain length of time (e.g. after 5 hrs and before 48 hrs.) for 2 or more than "n" times; then the Caller ID number is determined to be important, and automatically stores into the telephone directory.

Figure 3:
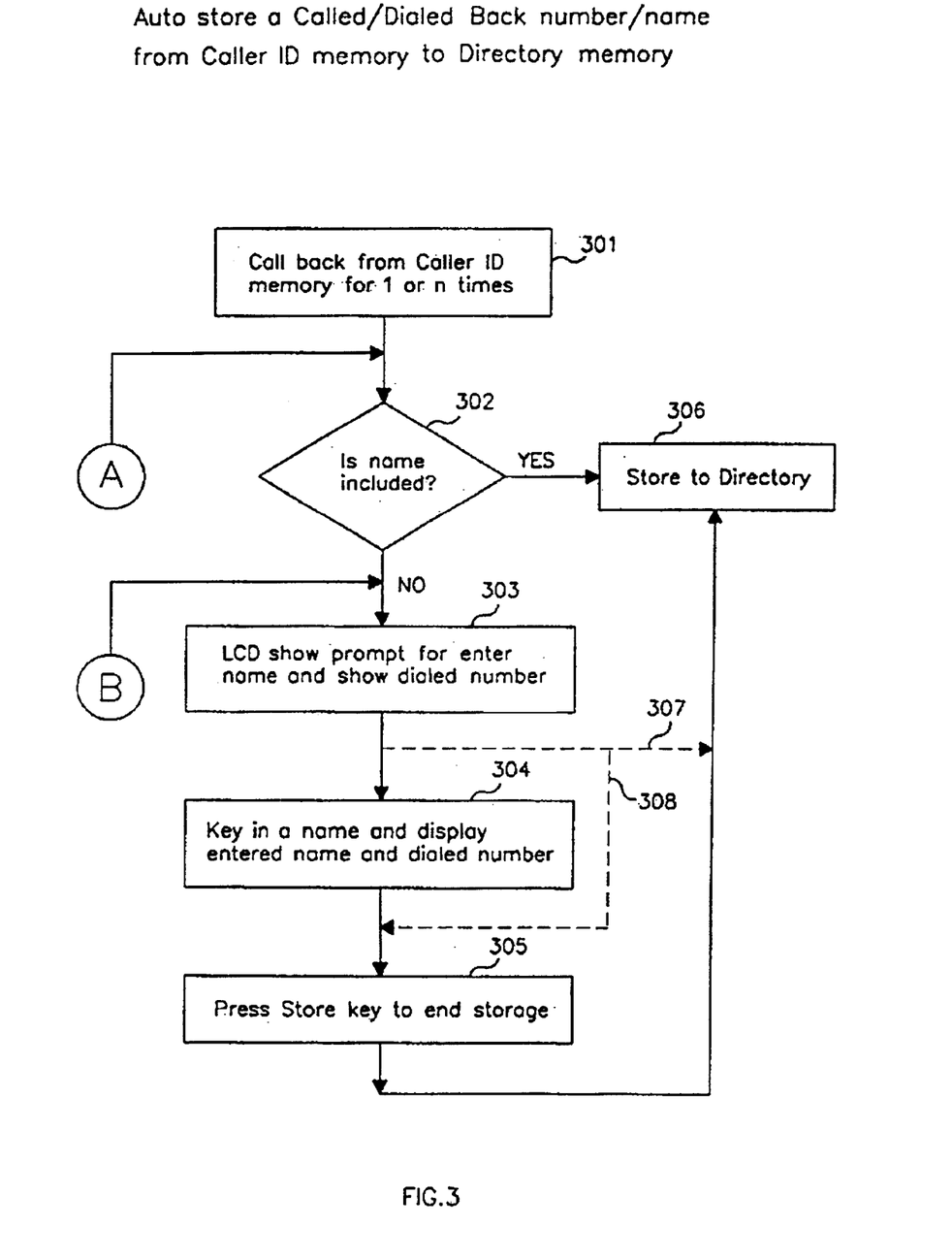
FIG. 3 is a flow diagram of the routines of storing a called back Caller ID data into the directory memory.

FIG. 3 is a detailed flow chart of the routine of storing a calling/dialing back Caller ID data into a permanent Directory Memory 116. When a Caller ID number is called/dialed back from the Caller ID Memory for 1 or n times, as shown in step 301 of FIG. 3, and is detected by microprocessor 112 or 106 then, at step 302, the microprocessor will further examine, whether the number is included with a name or not. If it is included, the number and name will be stored into the directory memory RAM of block 116 of FIG. 1 immediately as shown at step 306. Currently, most Caller ID services provide both number and name delivery service. However, if the number is not included with a name, microprocessor 112 or 106 will prompt the user to key in a name and then store into the directory as shown at steps 303 to 306 of FIG. 3.

As shown by a dotted line 307, steps 304 and 305 can be skipped by automatically adding the prompt of "Enter name" to the number and then storing the number with the prompt into the directory. The skipping of these steps may be automatically performed simply after a certain time delay without any key pressing, and the name of such number may entered later by the user or automatically entered when there is an incoming call of same number with name, and such processing will appear as shown at step 204 of FIG. 2 as previously mentioned.

As also shown by dotted line 308, step 304 may also be skipped by itself, i.e. the user can press the STORE key to end the storage if the user is reluctant to key in a name at the moment.

Figure 4:
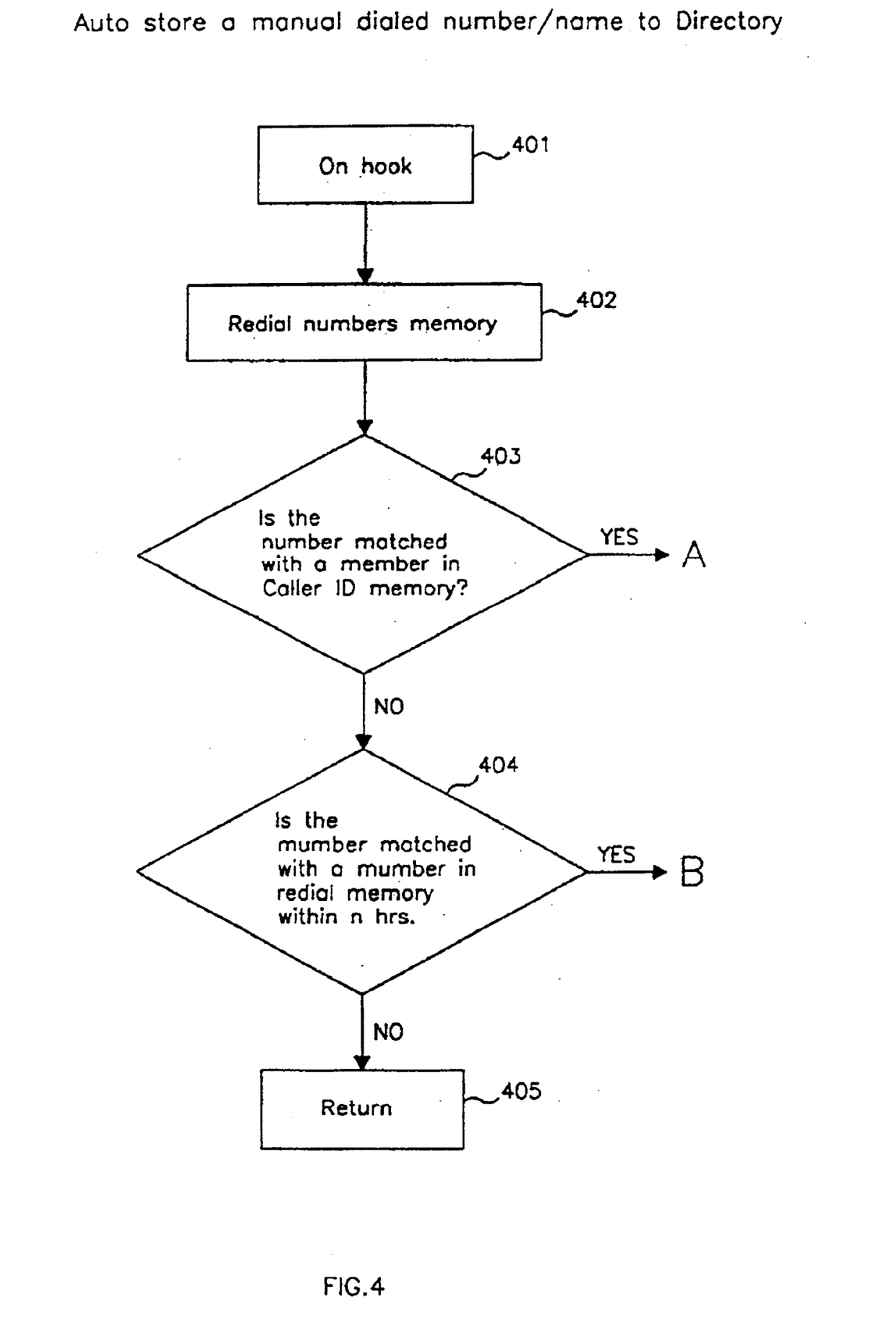
FIG. 4 is a flow diagram of the routines for auto storing an "important/frequently manual dialed" number into the directory memory.

FIG. 4 shows a detailed flow diagram of the routines for automatically storing an important/frequently manually dialed number into the Directory Memory 116.

In the present invention, the Redial Number Memory 114 of FIG. 1, is provided for storage of a list of dialed numbers. These numbers can be used for redial, and are also used for selecting important/frequently dialed numbers and auto transfer the selected numbers into the Directory Memory 116.

After completion of the manual dialing a number and the end of a call (and the hanging up of the receiver), the microprocessor will store the number into the Redial Number Memory 114 as shown at steps 401 and 402 of FIG. 4. And at step 403, the microprocessor will examine, whether the number is matched with any number in the Caller ID Memory 115. If there is a matched number, this number with its other data in the Caller ID Memory 115 will be further examined as shown in step 302 and further processed as shown at steps 303 to 306 of FIG. 3 and then stored into the Directory Memory 116.

If there is not a matched number in the Caller ID Memory 115, as shown at step 404, the microprocessor will examine if the number matches with a number in the redial numbers memory stored for within n hour(s) (and after m secs.). If YES, the number will be further processed as shown at step 303 to 305 and then stored into the directory.

Figure 5:
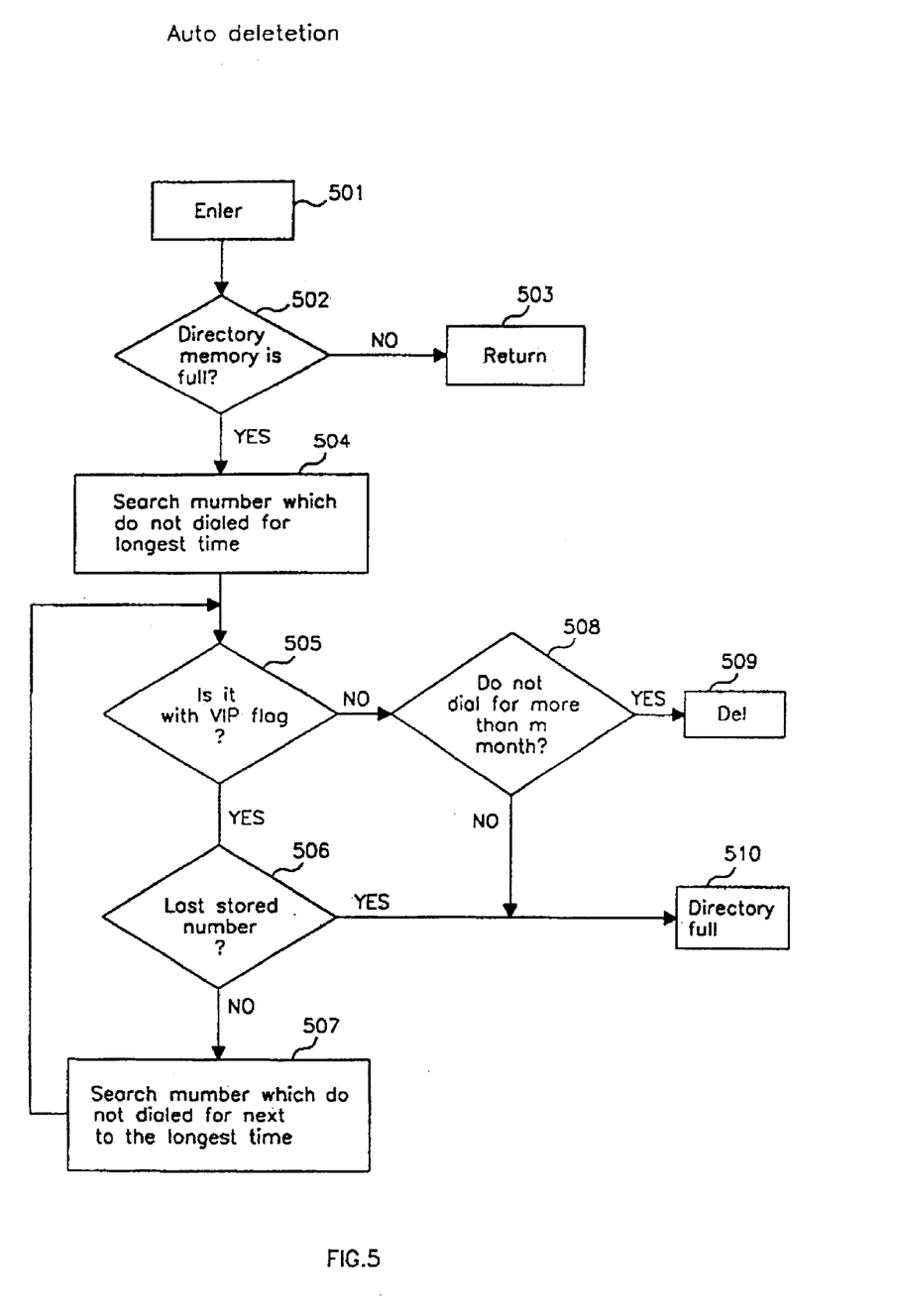
FIG. 5 is a flow diagram of the routines for automatic deletion of a number when it is least important.
Figure 6:
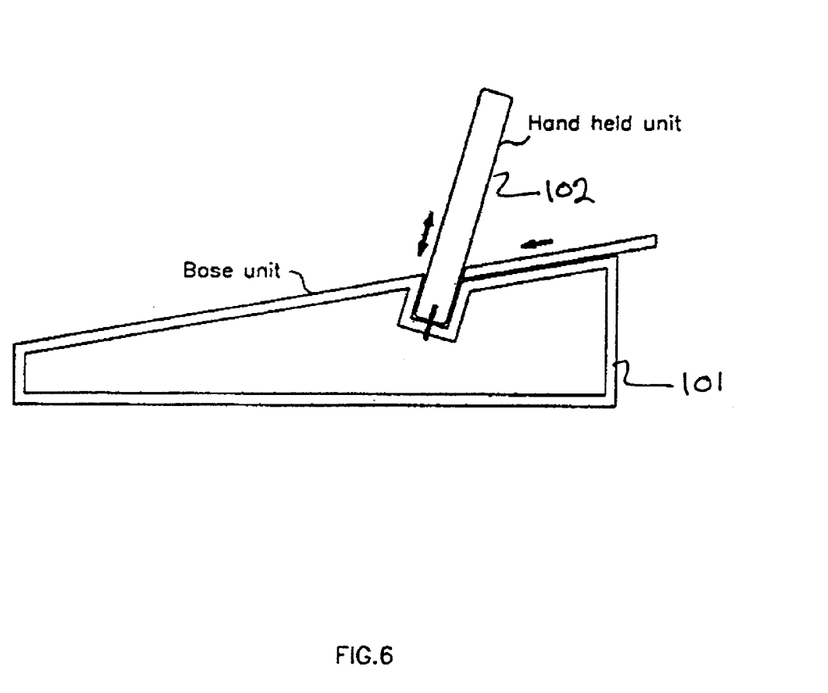
FIG. 6 is a side view of the base unit and the plug-in/out hand held unit.

FIG. 5 shows a flow chart for the detail routines for automatically deleting a number and its associated data for making room for a new entry when the directory memory is full. When a new entry is started, the microprocessor will examine at step 502 of FIG. 5 whether the directory memory is full or not. If YES, as shown at step 504, the microprocessor will search for a number which has not been dialed for the longest time and then examine at step 505, whether the number has a VIP flag. If NO, the microprocessor will further examine at step 508, whether it is has not been dialed for more than m months. If YES, as shown at step 509, this number will be deleted. If NO, as shown at step 510, a visual indicator or sound alerting signal or both for full of memory will be activated.

With regard to step 505, if the number has a VIP flag, which is defined as not for automatic deletion, then, at step 506, the microprocessor will further examine, whether it is a last/recently stored number. If YES, it will be processed to a same step 510. If NO, as shown at step 507, the microprocessor will search a number in the directory which has not been dialed for next to the previous longest time and then repeat the processing of step 505 and the following steps again.

This invention also provides a method and apparatus for automatic storage of area codes. All received Caller ID numbers will be compared with a list of manual dial out and/or actual call back (from Caller ID Memory) numbers. The area code will be extracted and stored to add it to the list of area codes. The list of numbers for comparison must be the numbers of a "successful" call. The way to judge whether or not a call is a successful call is to check, after completion of dialing, if there is time for conversation. The way to check this is to check the length of time from the end of completion of dialing to the start of hang up of the telephone line. Thus, if it takes more than 30 seconds, it is deemed to be a successful call.

The list of the successful call numbers exists in the Redial Numbers Memory 114 and Directory Memory 116. The method for processing of comparison and extraction of area code data and the storage into the memory is shown in FIGS. 7 and 8 and is similar to the processes discussed earlier.

Figure 7:
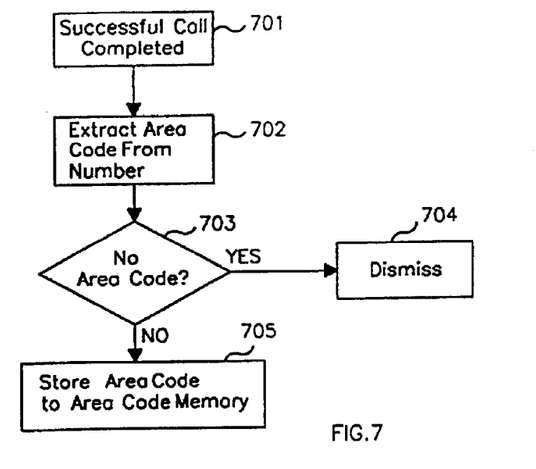
FIG. 7 shows a detailed flow diagram of automatic storage of area codes.

FIG. 7 shows a detailed flow diagram for the automatic storage of area codes. Every time an outgoing call is determined by the microprocessor as a successful call at step 701, the number dialed for that call is extracted from the redial numbers memory 114 at step 702. At step 703, if the number consists of 7 digits or less, then the number dialed has no area code, and it is dismissed at step 704. If the number has more than 7 digits, the first n digits, where n is normally 3, is added to area code memory 117.

Figure 8:
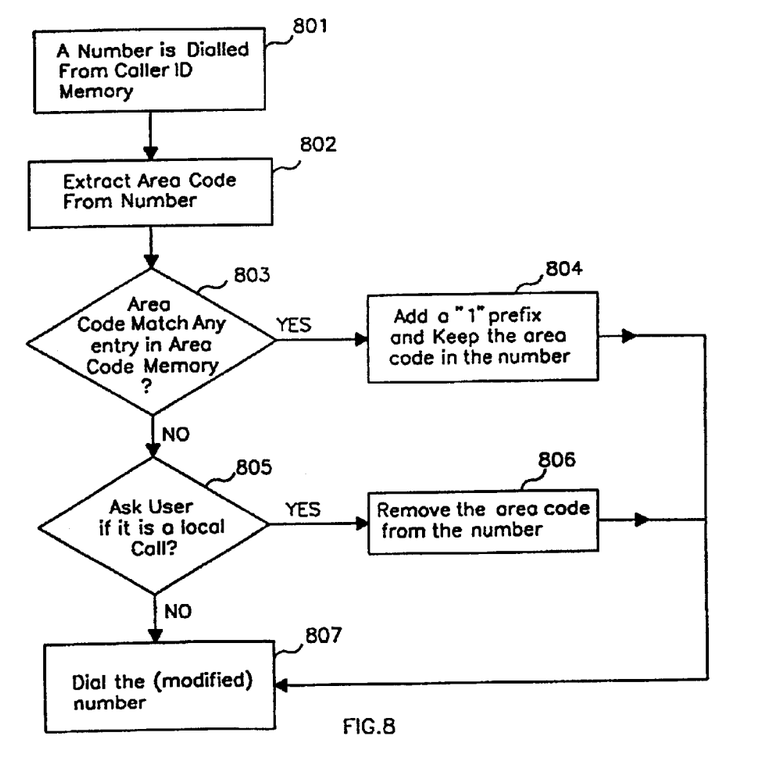
FIG. 8 is a flow chart for showing the process how calling back a number in Caller ID can be made more convenience and automated by intelligence addition to or removal of area code.

FIG. 8 is a flow chart showing how the process of calling back a number in Caller ID can be made more convenient and automated by intelligence addition to or removal of area code. At step 801, every time a user requests a number in Caller ID Memory 115, the area code of the number is first extracted at step 802, and then compared with the multiple area codes stored in the Area Code Memory 117 at step 803. If the area code of the Caller ID/redial number matches one of the entries in the Area Code Memory 117, then it is known that the number is outside of the user's area. A prefix of digit "1" is added to the number at step 804, as usually required by long distance calls. The modified number, including the "1" prefix and the area code, is then dialed to make a call. On the other hand, if the area code of the Caller ID/redial number has no matched entry in the Area Code Memory 117, then it is impossible to determine whether the number is inside or outside the user's area from the dialing history of the user. At this point, at step 805 a prompt can be displayed in the LCD to ask if the user wants to remove the area code from the number before dialing. If the user presses a button to indicate yes, then, at step 806, the area code is removed from the number. At step 807, the modified number is dialed.

Any number that is stored into the Redial Memory 114 and Directory Memory 116, and which originates from manual dialing, should be a successful call and which can be further examined and processed simply as just mentioned above. Area codes can be extracted from the number stored in these memories, and then stored in the area code memory.

As mentioned and shown in FIG. 1, block 102 of FIG. 1 can be a plug in/out hand held/carry unit. This architecture enables the method and apparatus of this invention to be used and combined with any apparatus which with electronic phone directory. Beside corded, cordless and mobile telephones and telephone add-on devices, other apparatus, such as data banks, organizers, PDAs (personal data assistant), hand-held computers and even traveling clocks, can use the method of this invention to automatically create a phone directory.

However, the plug-in architecture in only one of the architectures of the present invention. The base unit 101, including a microprocessor block 106 and a keyboard 107, can do all of the processing for the electronic directory. The created phone directory will be stored in the Directory Memory 116 which is connected to the microprocessor 106. Many recent microprocessors are available which provide build-in small and medium size RAM: for example, the Zilog Z8 series. In this case, to transfer the data of the directory from base unit 101 to hand held unit 102 needs only to use a single Input/Output port. Thus, the data transfer can simply be done using a wire pair or via a single channel of infrared or Radio Frequency (RF) signal. It can also be transferred via the telephone line by Dual Tone Multiple Frequency (DTMF). Or, Frequency Shifted Keying (FSK) coding and decoding can be used to enhance the reliability of data transfer. The coding/decoding of FSK can be simply processed by the microprocessor with built-in Digital Signal Processing (DSP) capability, as shown in block 112 of FIG. 1. And in this embodiment, remote data transfer can be performed.

Part of the circuitry, e.g., the Transmitter & Receiver circuitry of block 104 of the base unit 101 of FIG. 1 can be built as a small plug-in accessory, or the hand-held/hand carry unit can be combined with the Transmitter & Receiver circuitry and with a telephone jack. This accessory or combined hand-held unit can be used to plug into any telephone line, and dial a call/number to the base unit, and then send/dial a corresponding code for transferring a corresponding selection of data, e.g., the data of all calls or the data of only the new calls from the Caller ID memory of the base unit via the telephone line.

In a further embodiment of the present invention, an audio/voice facility is also added for audible presentation of the Caller ID and directory data. Any data, such as the name and numbers of the Caller ID, can be audibly alerted and announced. When the user review the Caller ID, in addition to displaying the Caller ID data on the screen, a speech synthesizer can also used to spell out the digits of the number in the Caller ID, and announce it via a speaker. This technology is commonly called "Voice Caller ID" or "Talking Caller ID", and one example can be found in the U.S. Pat. No. 5,265,145 from the same inventor of the present invention. Speech synthesizers commonly available in the market, or voice record/reproducing IC, or microprocessor with build-in DSP capability like block 112 of FIG. 1 can be utilized for converting the Caller ID data into audible speech.

As a further extension to the invention, any data from the base unit can be remotely audibly accessed by any telephone by dialing a phone call. The user can hear via the handset of the remote telephone the audible announcement of the number and/or name contained in the Caller ID, for the calls that have been received by the base unit. Before the user leaves his/her home or office where the base unit is located, the user first sets a switch on the unit to tell the unit to automatically answer a call to provide remote voice Caller ID after a number of ringing. Then, when the user is on the road, the user can make a phone call to the unit using, for example, a public pay phone, to hear the Caller ID of any call that the base unit received while the user was away. After the base unit automatically answers the call, a voice prompt can be played to the user via the telephone line: for example, "Enter the pass code." The user can use the digit keypad on the remote payphone to enter a 3 digit pass code. The digits are transmitted by DTMF tone via the telephone line. The base unit will decode the DTMF tone to obtain the pass code. If the pass code is incorrect, the base unit will automatically hang-up and terminate the call. If the pass code is correct, the base unit will play an audible announcement to tell the user how many new calls have been received, for example, "You have Six New Calls". The base unit will then proceed to play an audible announcement of the number and/or name, time and date of new Caller ID received in turns. For example, the base unit may play an voice announcement for the first Caller ID, "Call One, one-two-three-five-five-five-one-two-one-two, at nine-thirty AM, on twenty first of March." If the Caller ID includes name information, the name can also be spelled and played; or, alternatively, if the user had pre-recorded a voice representing the name that is associated with the Caller ID number, the pre-recorded voice can be played.

The user at the remote payphone may instruct the base unit to play the next Caller ID or the previous Caller ID by issuing commands via the digit keypad of the payphone. For example, if the base unit received a DTMF tone "1" sent from the payphone, it will be interpreted as a command for listening to the next voice Caller ID. The currently playing voice Caller ID will be interrupted, and the voice announcement of next Caller ID will be played instead. Similarly, if the user wants to hear the previous voice Caller ID again, the user can press the "2" digit key. Upon receiving the DTMF tone from the payphone, the base unit will play the voice announcement of the previous Caller ID.

The present invention can also be used for remote audible announcement of directory entries. Instead of number and name contained in Caller ID, the number and name in a directory entry can be played by voice announcement. The name in the directory can be spelled out, or the user can be required to speak the name in his/her own voice while adding the entry to the directory. The user's voice is recorded by base unit, which is then converted into digital form and stored in a voice memory. Then, when a voice announcement of the directory entry is to be played, the pre-recorded voice that was stored in the voice memory are converted back to audible voice, and played via the telephone line to the user.

In addition to playing all the entries in the directory one-by-one, further commands can be provided to allow easier access of the directory. For example, when the user presses "*01" in the keypad of the remote telephone, the base unit will respond by playing directory entries whose name begin with the character "A". Similarly, when the user presses "*02" in the keypad of the remote telephone, the base unit will respond by playing directory entries whose name begin with the character "B," etc.

In accordance with additional features of the invention, the base unit can be provided with power charging facility for charging the battery of the hand held unit when it is plugged in. The Dialing Signal Detectors 105 are used to detect/decode other dialing numbers by other telephones connected to the same telephone line. The method and circuitry of this block is also conventional and known. The number detected/acquired by this detector will be processed by the Microprocessor 112 for the automatic creation of phone directory, just as processing the number dialed by the Key Board 108 or 107. This detector will speed up the automatic creation of phone directory. However, it is an optional functional block.

If instead of an ordinary telephone, the user makes use of the hand-held unit 102 to place a call to the base unit 101, then it is not necessary to use audible means for accessing the Caller ID or directory information in the base unit. Instead, as mentioned before, because the Hand-held Unit 102 can be equipped with a transmitter-receiver unit, it can access the Caller ID or directory information in the base unit 101 by faster electronic means. For example, signal modulation using FSK modulation can be used for accessing the data. The process of remote access is very similar to that of using audio means. The user at a remote location makes use of a hand-held unit 102 to make a phone call to the base unit 101. The base unit 101 automatically answers the call after a certain number of ringing is detected. Via the transmitter-receiver units, the hand-held unit 102 sends access code signal to the base unit 101 to request Caller ID or directory data. The base unit 101 then send the requested Caller ID or directory data to the hand-held unit 102. The hand-held unit 102 store that data into its own memory 124 to 126 according, for later display on the LCD 111 to the user.

In the foregoing description of the invention, a preferred embodiment and several additional features have been disclosed. The invention is not limited thereto, however, and encompasses a variety of other embodiments and alternatives within the skill of those working in the art.

What is claimed is:

1. An electronic telephone directory automatically created by caller identification data in incoming telephone calls, comprising:

a permanent directory memory configured to store a collection of telephone numbers forming an electronic telephone directory;

a decision unit configured to determine if said caller identification data from an incoming telephone call is to be stored, wherein said determination is based on a response made by a user to the incoming telephone call and said determination is made without any direct user input indicating whether said caller identification data from said incoming telephone call is to be stored; and a circuit configured to write said caller identification data from said incoming telephone call into said permanent memory if said decision unit determines said data is to be stored;

wherein said incoming telephone call is a call-waiting call made available by a call waiting service and said incoming telephone call comes in while a current telephone call is in progress; and wherein said response made by said user include switching to a new caller from the call-waiting call, dropping a current caller from the current telephone call, or joining the new caller and the current caller into a conference call.

2. An electronic telephone directory as defined in claim 1 further comprising:

a caller identification memory to store caller identification data from prior incoming telephone calls;

a redialed numbers memory to store recently dialed numbers; and wherein said decision unit comprises a comparator that determines if said data is to be stored by examining whether said caller identification data from said telephone call matches either any of said caller identification data stored in said caller identification memory, any of said recently dialed numbers stored in said redialed numbers memory, or any of said collection of numbers in said permanent directory memory.

3. An electronic telephone directory as defined in claim 2, wherein:

said comparator and said circuit comprise a microprocessor; and said caller identification memory, said redialed numbers memory, and said permanent directory memory comprise locations in random access memory connected to said microprocessor.

4. An electronic telephone directory as defined in claim 2, wherein:

said determination done by said comparator relative to said caller identification data stored in said caller identification memory comprises determining whether said caller identification data from an incoming call matches a number from said caller identification memory that has been called back or received for more than a programmable amount of times within a programmable time interval; and said determination done by said comparator relative to said numbers stored in said redial memory comprises determining whether said number has been repeatedly dialed for more than a programmable amount of times within a programmable time interval.

5. An electronic telephone directory as defined in claim 2, wherein:

said directory also includes telephone numbers from outgoing calls;

said comparator further determines if said telephone number of said outgoing telephone call matches any of said telephone numbers stored in said caller identification memory, or any of said recently dialed numbers stored in said redialed numbers memory; and said circuit writes said telephone number from said outgoing telephone call into said permanent memory if said comparator determines the existence of a match.

6. An electronic telephone directory as defined in claim 2, wherein said directory further comprises deletion circuitry to automatically delete numbers from said permanent directory when said permanent memory is full, said deleted numbers being those which have not been dialed for more than a certain length of time unless such numbers have been protected against deletion.

7. An electronic telephone directory as defined in claim 2, wherein:

said directory further includes:
   a telephone dialer;
   an outgoing call number memory configured to store a dialed number that leads to a successful connection;
   an area code memory configured to store area codes of dialed numbers; and
   an extractor configured to determine if a number in said outgoing call number memory contains an area code by determining if the length of the number is larger than a predetermined value and extract the area code and store the area code into said area code memory if the area code is determined to be present in the number; and wherein said comparator further determines, for an outgoing call using a number from said caller identification memory, whether the area code of the number for the outgoing call matches one of the area codes stored in said area code memory, and wherein said dialer dials the area code of the number for the outgoing call and a predetermined prefix if a match is found by said comparator and said dialer does not dial the area code of the number for said outgoing call if no match is found by said comparator.

8. An electronic telephone directory as defined in claim 1, wherein:

said directory includes a base unit and a removable unit each containing said caller identification memory, said redialed numbers memory, and said permanent directory memory, and said directory includes circuitry to synchronize said memories in said base and removable units.

9. An electronic telephone directory as defined in claim 1, wherein said directory further comprises:

means for automatically answering a call after a predetermined number of ringing is detected;

audio generation means for converting said caller identification data or directory data into audible voice, and playing said voice to the telephone of the calling party via the telephone line; and DTMF tone detector means for detecting user-defined access codes requesting audible playing of caller identification data or directory data, and for also detecting a plurality of DTMF signals that cause different portions of caller identification data or directory data stored in said caller identification memory or directory memory to be played by said audio generation means.

10. A method of automatic creation of an electronic telephone directory from caller identification data in incoming telephone calls, comprising:

providing a caller identification memory to store respective caller identification data from prior incoming telephone calls;

providing permanent directory memory to store a collection of telephone numbers forming an electronic telephone directory;

determining if said respective caller identification data from said incoming telephone calls is to be stored, wherein said determination is based on responses made by respective users to the incoming telephone calls and said determination is made without any direct user input indicating whether said respective caller identification data from said incoming telephone calls is to be stored; and writing some or all of said respective caller identification data from said incoming telephone calls into said permanent memory based upon said determination;

wherein each of the incoming telephone calls is a call-waiting call made available by a call waiting service and the incoming telephone call comes in while a current telephone call is in progress; and wherein for each incoming telephone call, the response made by the corresponding user includes switching to a new caller from the incoming telephone call, dropping a current caller from the current telephone call, and joining the new caller and the current caller into a conference call.

11. A method of automatic creation of an electronic telephone directory as defined in claim 10, further comprising:

providing a redialed numbers memory to store recently dialed numbers;

making said determination by comparing said caller identification data from said incoming telephone call against either any of said caller identification memory, any of said recently dialed numbers stored in said redialed numbers memory, or any of said collection of numbers in said permanent directory memory to determine the existence of a match; and writing said caller identification data from said incoming telephone call into said permanent memory if said comparison determines the existence of a match.

12. A method of automatic creation of an electronic telephone directory as defined in claim 10, wherein said step of determining includes the steps of:

evaluating whether the telephone number in said incoming call matches a number from said caller identification memory that has been called back for more than a programmable amount of times within a programmable time interval;

evaluating whether the telephone number in said incoming call matches a number from said caller identification memory that has been received repeatedly for more than a programmable amount of times within a programmable time interval; and evaluating whether the telephone number in said incoming call matches a number from said redialed memory that has been repeatedly dialed out after and before a certain length of time.

13. A method of automatic creation of an electronic telephone directory as defined in claim 10, further comprising:

flagging numbers in said permanent memory that are to be permanently stored;

detecting when said permanent memory is full; and deleting the number which has not been dialed for the longest length of time and not bearing a flag from said permanent memory.

14. The method of creating an electronic telephone directory as defined in claim 10, wherein said method further comprises:

providing an outgoing call number memory to store a dialed number that leads to a successful call connection;

providing an area code memory to store area codes of dialed numbers;

determining if a number in the outgoing call number memory contains an area code by determining if the length of the number is larger than a predetermined value;

extracting the area code and storing the area code into said area code memory if the area code is determined to be present in the number;

determining, for an outgoing call using a number from said caller identification memory, whether the area code of the number for the outgoing call matches one of the area codes stored in said area code memory;

dialing the area code of the number for said outgoing call and a predetermined prefix if a match is found; and discarding the area code of the number for said outgoing call if a match is not found unless the user directs to the contrary.

* * * * *